US010795829B2

(12) United States Patent
Chhabra et al.

(10) Patent No.: US 10,795,829 B2
(45) Date of Patent: Oct. 6, 2020

(54) DEVICE, METHOD AND SYSTEM TO SELECTIVELY PROVIDE DATA VALIDATION FUNCTIONALITY

(71) Applicant: Intel Corporation, Santa Clara, CA (US)

(72) Inventors: Siddhartha Chhabra, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 16/145,942

(22) Filed: Sep. 28, 2018

(65) Prior Publication Data

US 2020/0104266 A1   Apr. 2, 2020

(51) Int. Cl.
*G06F 12/14* (2006.01)
*G06F 21/62* (2013.01)
(Continued)

(52) U.S. Cl.
CPC ...... *G06F 12/1433* (2013.01); *G06F 12/1408* (2013.01); *G06F 21/62* (2013.01);
(Continued)

(58) Field of Classification Search
CPC .. G06F 12/1433; G06F 21/62; G06F 12/1408; G06F 21/64; G06F 21/74;
(Continued)

(56) References Cited

U.S. PATENT DOCUMENTS 5,684,948 A * 11/1997 Johnson ................ G06F 9/3863
710/260
6,651,171 B1 * 11/2003 England .............. G06F 12/1491
711/163
(Continued)

FOREIGN PATENT DOCUMENTS

EP          3367287          8/2018

OTHER PUBLICATIONS

Extended European Search Report from European Patent Application No. 19195780.2 dated Feb. 3, 2020, 9 pgs.

*Primary Examiner* — David Yi
*Assistant Examiner* — Zubair Ahmed
(74) *Attorney, Agent, or Firm* — Green, Howard & Mughal LLP

(57) ABSTRACT

Techniques and mechanisms for configuring services which variously facilitate data protection. In an embodiment, circuitry coupled to a memory comprises both a first circuit which calculates integrity information based on data, and a second circuit which evaluates data validity based on such integrity information. A configuration of the circuitry provides a combination of one or more services which is specific to a corresponding domain of the memory. With respect to accesses to the corresponding domain, the configuration prevents an access to the first circuit while an access to the second circuit is permitted. In another embodiment, a processor signals the circuitry to transition to another configuration which, with respect to accesses to the corresponding domain, permits access to both the first circuit and the second circuit.

23 Claims, 12 Drawing Sheets

(51) Int. Cl.
*G06F 21/64* (2013.01)
*G06F 21/74* (2013.01)
*G06F 21/78* (2013.01)
*H04L 9/14* (2006.01)

(52) U.S. Cl.
CPC .............. *G06F 21/64* (2013.01); *G06F 21/74* (2013.01); *G06F 21/78* (2013.01); *H04L 9/14* (2013.01); *G06F 2212/1052* (2013.01)

(58) Field of Classification Search
CPC .. G06F 21/78; G06F 2212/1052; G06F 21/79; G06F 21/72; G06F 21/53; H04L 9/14
USPC ....................................................... 711/163
See application file for complete search history.

(56) References Cited

U.S. PATENT DOCUMENTS

| | | |
|---|---|---|
| 10,303,899 B2 | 5/2019 | Durham et al. |
| 2010/0281273 A1 | 11/2010 | Lee et al. |
| 2011/0145598 A1* | 6/2011 | Smith ................... G06F 21/554 713/190 |
| 2017/0024573 A1* | 1/2017 | Bhattacharyya ........ G06F 21/64 |
| 2018/0046823 A1 | 2/2018 | Durham et al. |

\* cited by examiner

| Key ID | Crypto. Key | Mode |
|---|---|---|
| 208a — 000 | ABC | Generate and Verify, with Encryption/Decryption |
| 208b — 001 | LMN | Encryption/Decryption only |
| 208c — 010 | XYZ | Generate and Verify, with Encryption/Decryption |
| 208d — 011 | PQR | Encryption/Decryption only |

208

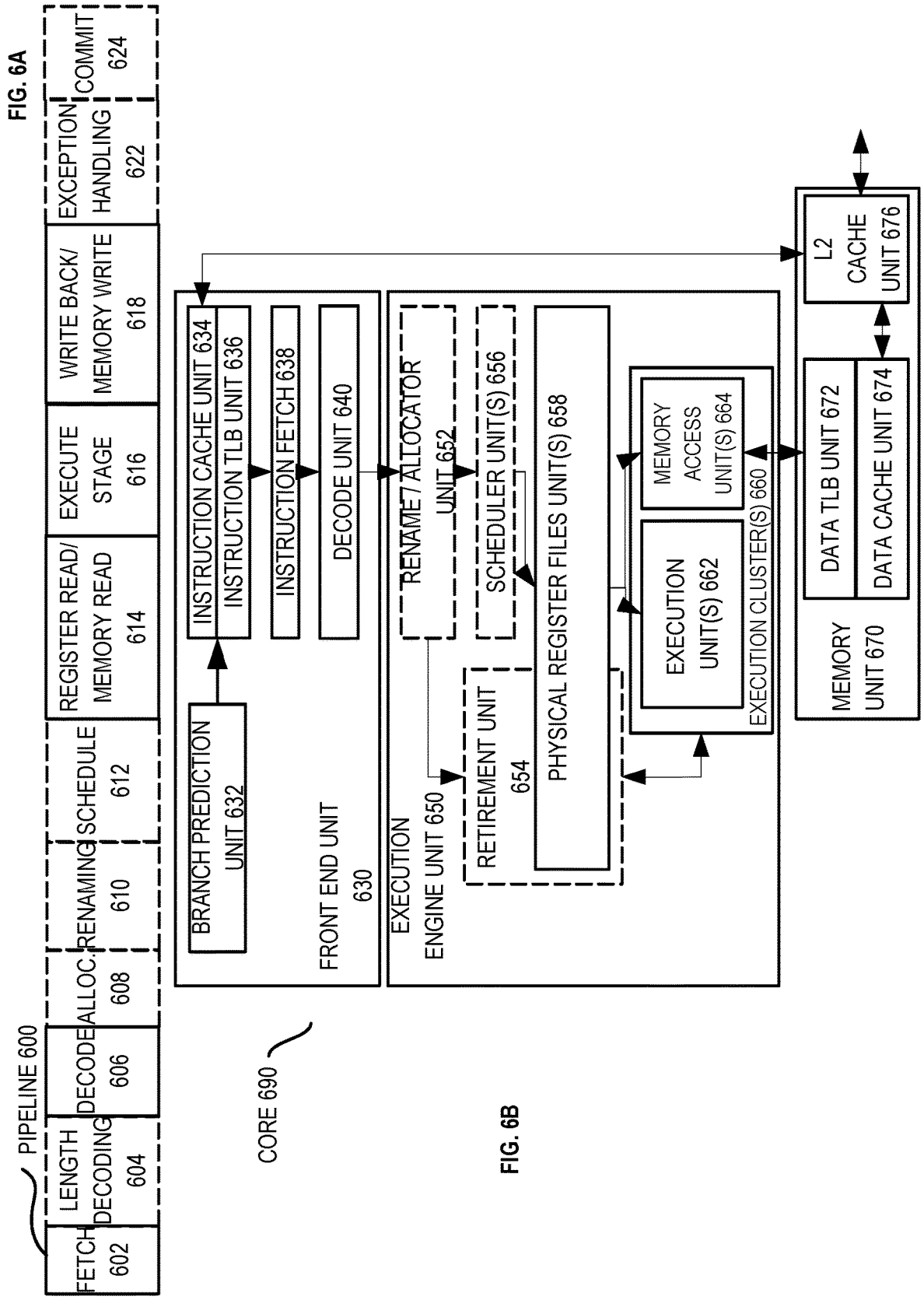

DEVICE, METHOD AND SYSTEM TO SELECTIVELY PROVIDE DATA VALIDATION FUNCTIONALITY

BACKGROUND

1. Technical Field

This disclosure relates in general to the field of computer security, and more particularly, though not exclusively, to data integrity verification.

2. Background Art

Encryption of memory in a device, such as a personal computer, a smart mobile phone, and so on, is used to protect data stored in the memory when the device is operating, lost, stolen, and so on. Encrypted memory, however, remains vulnerable to corruption by an adversary via various initial and/or repeated memory corruption attacks. Thus, a processor is susceptible to executing corrupt data, causing an array of undesirable effects such as, for example, a failed password login attempt, an application misbehaving, a device crashing, and so on. Conventional techniques implement various strategies to maintain integrity of the memory in an attempt to minimize malicious changes to encrypted data (e.g., stored data).

However, various inefficiencies and/or other problems arise in certain contexts wherein a server or other computer platform is configured to implement both encryption/decryption protection mechanisms and data validation mechanisms. As hacking, malware and other threats to computer platforms continue to proliferate in number and variety, there is an increasing demand for cloud service providers (CSPs) and other online services, for example, to provide more robust protection for workloads running on their platforms.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
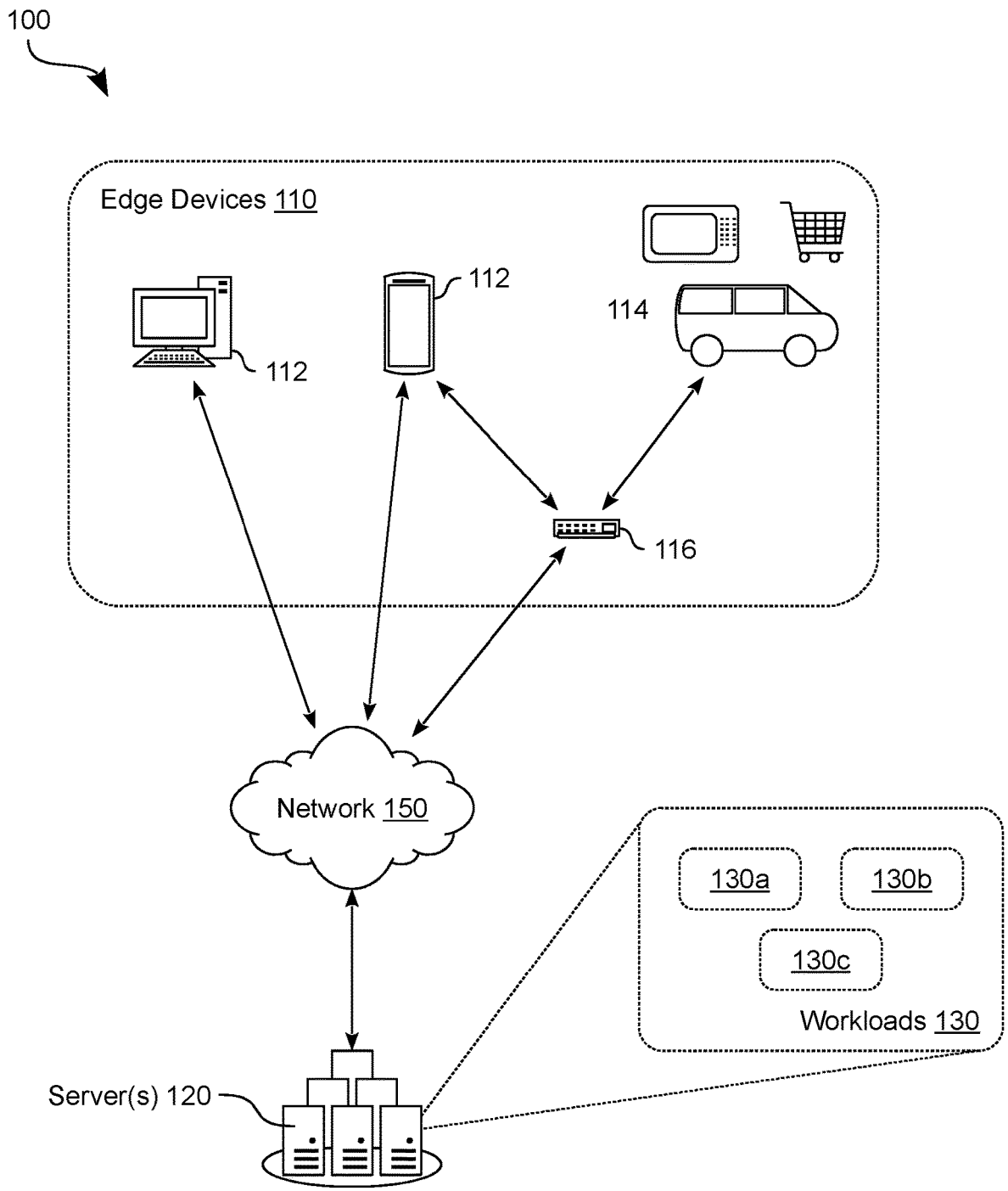
FIG. 1 illustrates a schematic diagram of an example computing system in accordance with certain embodiments.

Embodiments discussed herein variously provide techniques and/or mechanisms for configuring access to circuitry to facilitate selective protection of data and/or software which is to operate on or otherwise use data. In an embodiment, circuitry is coupled to a processor and a memory, where the circuitry is configurable to selectively use—or forego using—a functionality (referred to herein as a "protection functionality" or a "protection service") for facilitating data and/or software protection based on at least some accesses to the memory by said processor. Such circuitry is capable of providing any of a plurality of protection services including, for example, a first service to calculate integrity information, and a second service to evaluate a validity (or invalidity) of data based on previously-calculated integrity information. In some embodiments, the plurality of protection services further comprises one or more encryption and/or decryption ("encryption/decryption" herein) services—e.g., to encrypt data being written to memory and/or to decrypt data which is read from memory.

As used herein, "integrity information" refers to one or more values which are to function as a fiducial (i.e., a reference) for use in determining whether a later-in-time version of data has been modified—e.g., unintentionally or without authorization—from an earlier-in-time version of said data. Such integrity information includes a hash, a checksum, a message authentication code (MAC) or any of a variety of other such values.

In some embodiments, protection service circuitry is configurable—e.g., reconfigurable—to provide or otherwise operate based on a correspondence of a given domain of a memory with a particular one or more protection services. Based on a configuration of such circuitry, one or more protection services are applied to data which is communicated with the processor and the memory. In some embodiments, such a configuration prevents one or more other protection services from being applied to the data. For example, the configuration may, with respect to accesses to a given memory domain, disable or otherwise prevent a service which would otherwise evaluate a validity/invalidity of data based on previously-calculated integrity information. In one such embodiment, the configuration concurrently enables or otherwise permits a service which calculates integrity information for data being written to that same memory domain.

For brevity, "generate, but not validate" (or "GNV") refers herein to an availability of a combination of one or more protection services which enables or permits the generation of integrity information for data being written to a memory domain, but which is also prevented from performing a data validation—based on such integrity information—for data which is read from that memory domain. By contrast, "generate and validate" (or "GV") refers herein to an availability of a combination of one or more protection services which enables or permits both the generation of integrity information for a data write to a domain, and the performance of data validation for a data read from that domain. Accordingly, a configuration of circuitry may include a "GNV mode" which is to make available a GNV combination of services, and/or a "GV mode" which is to make available a GV combination of services. In making different protection modes available—e.g., including a GNV mode and a GV mode—some embodiments enable different software to avail of various respective types of protection mechanisms.

Currently, some software is able to avoid certain data integrity error messages that, with older software, are caused at least in part by operation of encryption/decryption protection mechanisms. For example, some encryption/decryption protection and/or data integrity protection relies on key identifiers (KeyIDs) which each identify a respective domain of a memory. Typically, a platform KeyID (KeyID 0) is under control of a BIOS, whereas other KeyIDs—e.g, KeyID 1, . . . , KeyID N—are made available for control by an operating system and/or other system software. Often in these schemes, software is required to follow a particular sequence of operations to re-assign a key associated with a given domain (e.g., to reallocate a page in memory from supporting one workload to supporting another workload). Such a sequence also requires proper initialization of memory to ensure there are no false data integrity failures.

In many cases, legacy software which supports encryption/decryption protections—such as multi-key total memory encryption (MKTME)—predates certain techniques for data integrity protection. As a result, the legacy software performs key re-assignment and/or other operations in a way which contributes to false data integrity errors. For brevity, this type of software is referred to herein as "non-enlightened" software—e.g., as contrasted with "enlightened" software which is able to avoid such false data integrity errors.

Configuration of a GNV mode or a GV mode includes the selective permitting or preventing—e.g., by a BIOS, or alternatively, by an operating system or other software which starts after system boot up—of a first service to calculate integrity information, and the second service to evaluate a validity (or invalidity) of data based on previously-calculated integrity information. For example, a BIOS may initially configure a "global" GNV mode which is to apply for accesses to any domain of a memory. Such a mode further enables or otherwise permits encryption/decryption protection for such accesses—e.g., wherein encryption is configured for data writes to any domain and decryption is configured for data reads from any domain. A data write during such a global GNV mode includes integrity information (e.g., a MAC value) being generated using a key that is associated with the platform key identifier—e.g., irrespective of whether the data write accesses a memory location which is associated with a different key. Data validation based on this integrity information is omitted for a subsequent data read (during said global GNV mode) from the memory location. By foregoing such data validation, some embodiments variously facilitate operation of legacy software which cannot support (and/or is not aware of) data validation mechanisms—e.g., where the legacy software can still avail of encryption/decryption protections.

In one such embodiment, an operating system (or other system software) subsequently communicates an instruction to reconfigure protection services—e.g., to enable integrity protections at least with respect to one or more memory domains. By way of illustration and not limitation, a platform configuration instruction (PCONFIG) may configure a "global" GV mode which is to apply for accesses to any domain of a memory. Such a global GV mode makes available both the first service to calculate integrity information, and the second service to evaluate a validity (or invalidity) of data based on previously-calculated integrity information.

During a global GV mode, software is able to selectively control the protection services which are to be variously permitted or prevented for accesses to a given one or more memory domains. In one example scenario, memory accesses to a domain corresponding to a KeyID 1 is provided with both encryption/decryption protection and the integrity protections of the first service and the second service. Alternatively or in addition, memory accesses to another domain corresponding to a KeyID 2 may be provided with encryption/decryption protection alone. For example, an enlightened operating system may prevent both the first service and the second service for memory accesses to this other domain—e.g., despite the enabling of such services by the BIOS. Such a configuration is a domain-specific "local no-generate, no-validate" mode, which limits some protections that are otherwise enabled within a global GV mode.

Embodiments variously enable a GV mode (for example) to protect data used by enlightened software—e.g., while additionally or alternatively enabling a GNV mode to protect data used by non-enlightened software. Accordingly, enlightened software is able to avail of both encryption/decryption protections and data validation protections, and non-enlightened software is able to avail of encryption/decryption protections. In some embodiments, such non-enlightened software is also able to avail of a service to generate integrity information which, for example, can subsequently be exploited for validation of data when it is used by other (enlightened) software. By contrast, current solutions variously maintain backward compatibility for legacy software by simply foregoing data validation protection for a platform key identifier (e.g., KeyID 0). More particularly, conventional machines variously include encryption/decryption circuitry and data validation circuitry, but in order to allow legacy software to avail of encryption/decryption on such a machines (without experiencing false data integrity errors), a BIOS of the machine must turn off data validation for the platform key identifier. As a result, data integrity protection is not available even for enlightened software.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1 shows features of a computing system 100, according to an embodiment, to selectively provide (or forego providing) a protection service such as one to evaluate validity/invalidity of data read from a memory. Computing system 100 is one example of an embodiment wherein circuit logic—e.g., including a processor and/or memory protection circuitry to communicate with a processor—supports an instruction set architecture (ISA), an instruction of which is to enable or disable a GNV mode.

In various embodiments, computing system 100 and/or its underlying components provide data validation functionality and control functionality to selectively enable or disable some or all such data validation functionality. System 100 further provides encryption/decryption memory protection functionality, for example. In the example embodiment shown, one or more servers 120 (of a cloud service provider, for example) of system 100 host one or more workloads 130 (e.g., data and/or applications) each for a respective customer, third party and/or other such client. Accordingly, in some embodiments, one or more servers 120 variously implement data integrity and/or encryption/decryption memory protection (e.g., multi-key or other) to provide memory protection on a per-client basis—e.g., ensuring that at least some of the illustrative workloads 130a, 130b, 130c are each separately protected and isolated using a respective unique encryption key. Encryption/decryption and/or data validation memory protection also variously implemented, in some embodiments, by other components of system 100, such as edge devices 110.

The various components in the illustrated example of computing system 100 will now be discussed further below.

Edge devices 110 include any equipment and/or devices deployed or connected near the "edge" of a communication system 100. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 communicate with each other and/or with other remote networks and services (e.g., one or more servers 120) through one or more networks and/or communication protocols, such as communication network 150. Moreover, in some embodiments, certain edge devices 110 include memory protection functionality as described throughout this disclosure.

End-user devices 112 include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 include any device capable of communicating and/or participating in an Internet-of-Things (IoT) system or network. IoT systems include multiple devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with the one or more servers 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 are built from sensors and communication modules integrated in or attached to "things," such as equipment, toys, tools, vehicles, living things (e.g., plants, animals, humans), and so forth. Alternatively, or additionally, certain IoT devices 114 rely on intermediary components, such as edge gateways or routers 116, to communicate with the various components of system 100.

IoT devices 114 include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 include equipment and devices associated with aircrafts, automobiles, or vessels, such as navigation systems, autonomous flight or driving systems, traffic sensors and controllers, and/or any internal mechanical or electrical components that are monitored by sensors (e.g., engines). Moreover, an IoT device 114 can also be any type of edge device 110, including end-user devices 112 and edge gateways and routers 116.

Edge gateways and/or routers 116 are used to facilitate communication to and from edge devices 110. For example, gateways 116 provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or the one or more servers 120 using another wired or wireless communication medium (e.g., Ethernet, Wi-Fi, cellular). In some embodiments, a gateway 116 is implemented by a dedicated gateway device, or by a general-purpose device, such as another IoT device 114, end-user device 112, or other type of edge device 110.

In some instances, gateways 116 also implement certain network management and/or application functionality (e.g., IoT management and/or IoT application functionality for IoT devices 114), either separately or in conjunction with other components, such as the one or more servers 120 and/or other edge devices 110. For example, in some embodiments, configuration parameters and/or application logic are pushed or pulled to or from a gateway device 116, allowing IoT devices 114 (or other edge devices 110) within range or proximity of the gateway 116 to be configured for a particular IoT application or use case.

The one or more servers 120 include services that are hosted remotely over a network 150—e.g., in a "cloud." In some embodiments, for example, one or more servers 120 (e.g., including one or more application servers and/or database servers) are remotely hosted in a datacenter. The one or more servers 120 include any of various services that can be utilized by or for edge devices 110, including but not limited to, data and application hosting, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, certain of the one or more servers 120 each include memory protection functionality described in this disclosure.

Network 150 is used to facilitate communication between the components of computing system 100. For example, edge devices 110, such as end-user devices 112 and IoT devices 114, use network 150 to communicate with each other and/or access one or more servers 120. Network 150 includes any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

In some embodiments, a computer platform of system 100—e.g., a server of the one or more servers 120—includes functionality to support data integrity validation. Such functionality supports the generation of integrity information based on some data, and/or may support a subsequent evaluation, based on such integrity information, as to whether an unauthorized (e.g., accidental or malicious) modification to said data has occurred. In one such embodiment, the computer platform further comprises control functionality to selectively disable, at least in part, the providing of such functionality.

In an embodiment, memory protection circuitry of the computer platform is variously (re)configurable, at different times, to support either one of a GNV mode or a GV mode. In a GV mode, both functionality to generate integrity information and data validation functionality (to evaluate data integrity based on such integrity information) are enabled for at least some domain in memory to which the GV mode applies. In a GNV mode, data validation functionality is disabled for at least some memory domain to which the GNV mode applies—e.g., while functionality to generate integrity information for that same memory domain remains enabled. In practice, a GNV mode is likely to be implemented only on a global level for all memory domains—e.g., insofar as enlightened (non-BIOS) software would typically not have a reason to forego data validation, but require the generation of integrity information.

In some embodiments, a processor supports an ISA, an instruction of which is to transition memory protection logic to or from a GNV mode (e.g., between a GNV mode and a GV mode). In other embodiments, memory protection logic comprises circuitry to transition to or from a GNV mode—e.g., responsive to such an instruction of an ISA. Alternatively or in addition, such memory protection logic, based on a current operational mode thereof—e.g., based on one of a GNV mode or a GV mode—is to evaluate data validity, or (alternatively) forego such evaluating. In other embodiments, one or more non-transitory computer-readable storage media have stored thereon instructions which, when executed by one or more processors, cause the one or more processors to perform a method comprising transitioning memory protection logic to or from a GNV mode. As indicated above, enlightened (non-BIOS) software would not reconfigure a GNV mode, in general practice, insofar as such enlightened software would typically not have a reason to forego data validation while also requiring the generation of integrity information.

Any, all, or some of the computing devices of system 100 is adapted to execute one of various operating systems, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 are utilized in each alternative implementation of the present disclosure. Additionally, one or more of the elements described in connection with the examples of FIG. 1 may be located external to system 100, while in other instances, certain elements are included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2A:
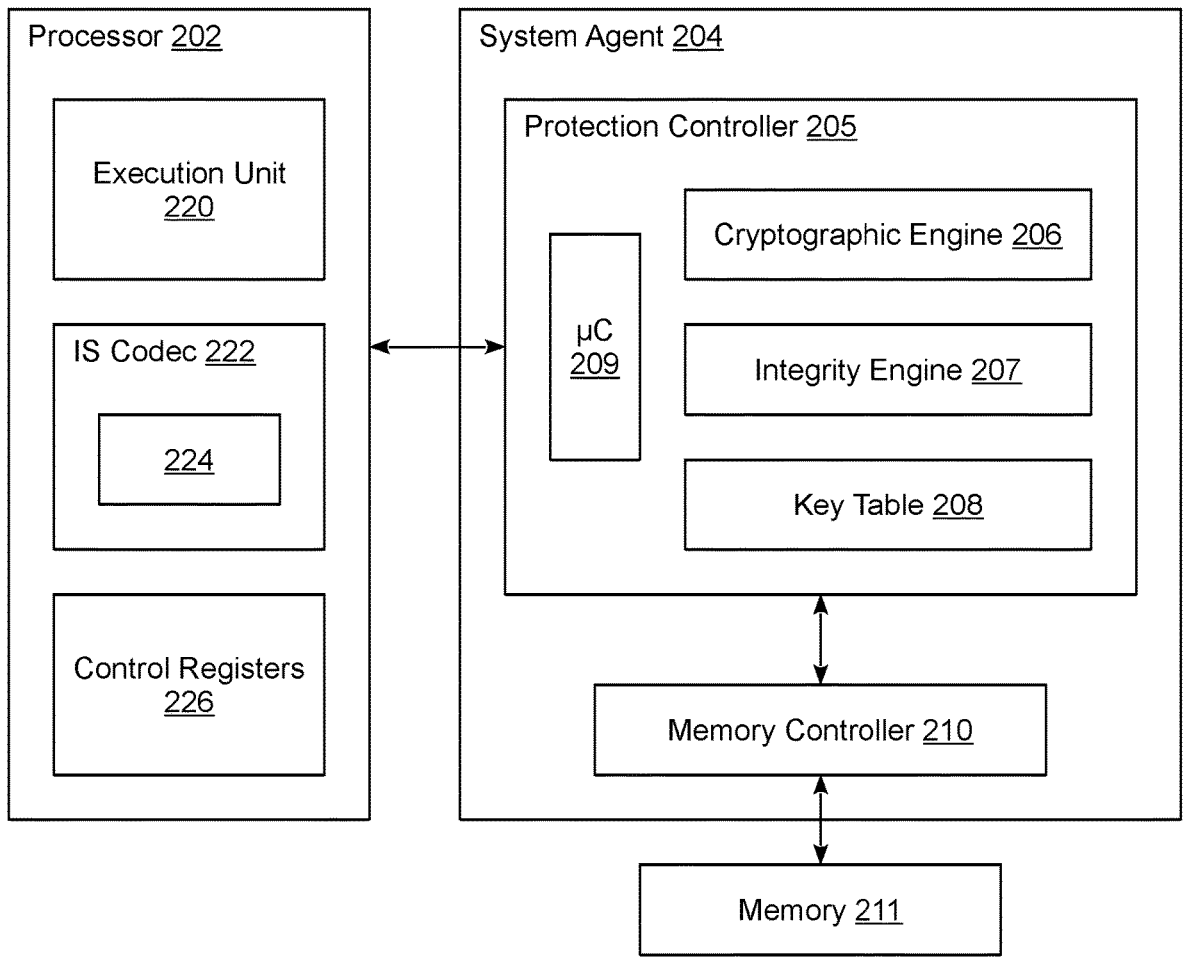
FIGS. 2A, 2B variously illustrate an example embodiment of a memory protection system in accordance with certain embodiments.
Figures 2B, 2C:
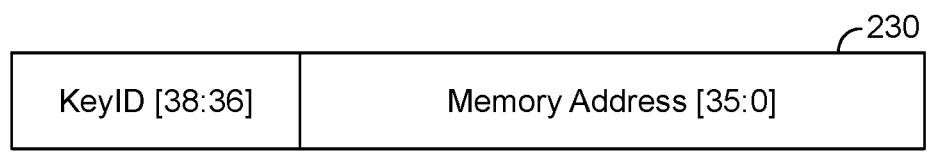
FIG. 2C illustrates a format of key identifier information used by memory protection circuitry in accordance with certain embodiments.

FIGS. 2A, 2B variously show features of a computer device 200 to selectively provide data validation functionality according to an embodiment. Computer device 200 is one example of an embodiment which supports functionality to transition memory protection circuitry to or from a GNV mode—e.g., wherein the GNV mode is one of many available operational modes each to apply a respective type of protection to a corresponding domain of a memory. Computer device 200 includes features of the one or more servers 120, for example.

As shown in FIGS. 2A, 2B, computer device 200 includes a processor 202, a system agent 204, and a memory 211 coupled to processor 202 via system agent 204. As described further below, computer device 200 provides validation protection (and in some embodiments, encryption/decryption protection) of data stored on memory 211. Processor 202 is used to execute instructions, code, and/or any other form of logic or software, such as instructions associated with a software application. Processor 202 includes any of various combinations of logic or processing elements operable to execute instructions, whether loaded from memory or implemented directly in hardware, such as a microprocessor, digital signal processor, field-programmable gate array (FPGA), graphics processing unit (GPU), programmable logic array (PLA), or application-specific integrated circuit (ASIC), among other examples.

The processor 202 includes any of a variety of central (or other) processing units of any suitable architecture, such as that of a complex instruction set computer (CISC), a reduced instruction set computer (RISC), very long instruction word (VLIW), multi-threaded or hybrid architecture. In the example embodiment shown, processor 202 includes an instruction set encoder and/or decoder (IS Codec) 222 and an execution unit 220, coupled thereto, for executing instructions. Of course, the processor 202 comprises additional circuitry which is not necessary to understanding certain embodiments. The IS Codec 222 operates, responsive to execution unit 220, to encode instructions which are output from processor 202, the instructions for other circuitry (e.g., including a protection controller 205 of computer device 200) to perform appropriate operations. The IS Codec 222 may be implemented using any number of different mechanisms (e.g., a look-up table, a hardware implementation, a PLA, etc.). In some embodiments, the IS Codec 222 is further used for decoding instructions, received by processor 202, into control signals and/or microcode entry points. In response to such control signals and/or microcode entry points, the execution unit 220 performs the appropriate operations. As described herein, IS Codec 222 supports an instruction set, a platform configuration instruction 224 of which is for processor 202 to signal that protection controller 205 is to implement, at least with respect to some domain of memory 211, a particular one of a GV mode or a GNV mode.

Memory 211 is used to store information, such as code and/or data used by processor 202 during execution, and/or persistent data associated with an application or user of computer device 200. Memory 211 includes any of various types or combinations of components capable of storing information, including volatile memory (e.g., random access memory (RAM), such as dynamic RAM (DRAM), synchronous dynamic RAM (SDRAM), and static RAM (SRAM)) and/or non-volatile memory (e.g., storage class memory (SCM), direct access storage (DAS) memory, non-volatile dual in-line memory modules (NVDIMM), and/or other forms of flash or solid-state storage).

System agent 204 is used to provide various functions for processor 202, such as managing access to memory 211 and/or other resources of computer device 200. In the illustrated embodiment, for example, system agent 204 includes a memory controller 210 to control and/or manage access to memory 211 of computer device 200. Moreover, as described further below, system agent 204 also includes a protection controller 205 to protect data stored on memory 211. In some embodiments, system agent 204 also provides an interface between processor 202 and other components of computer device 200 (e.g., using a direct media interface (DMI) and/or PCI-Express bridge). In various embodiments, system agent 204 includes any combination of logic elements configured to perform functionality of system agent 204 described herein, whether loaded from memory or other non-transitory computer readable medium, or implemented directly in hardware, including by way of non-limiting examples: a microprocessor, digital signal processor (DSP), field-programmable gate array (FPGA), graphics processing unit (GPU), programmable logic array (PLA), application-specific integrated circuit (ASIC), and/or virtual machine (VM) processor. Some of all of system agent 204 may be integrated with processor 202, or alternatively, system agent 204 may be implemented separately—e.g., on a different integrated circuit (IC) chip communicatively coupled or connected to processor 202.

Memory controller 210 is used to control and/or manage access to memory 211 of computer device 200. In various embodiments, memory controller 210 is implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

In the illustrated embodiment, computer device 200 provides data validation protection (and in some embodiments, encryption/decryption protection) based on accesses to memory 211. In some embodiments, for example, data validation protection and encryption/decryption protection is implemented by extending and/or modifying a particular computer architecture. For example, memory protection is implemented in some embodiments by extending the functionality of a processor 202 and/or introducing a protection controller 205. In the illustrated embodiment, for example, processor 202 is extended to support control registers 226 and processor instruction(s) that can be used to selectively enable or disable at least some protection functionality—e.g., where protection controller 205 is implemented to provide (or forego providing) data validation accordingly. Although the illustrated example uses separate logical blocks to depict protection controller 205 and processor 202, in actual embodiments protection controller 205 and processor 202 are integrated together or alternatively are implemented as separate components. In various embodiments, for example, protection controller 205 is implemented using any combination of hardware and/or software logic, including a microprocessor, application-specific integrated circuit (ASIC), field-programmable gate array (FPGA), programmable logic array (PLA), virtual machine (VM), and/or any other type of circuitry or logic.

In the example embodiment shown, an integrity engine 207 included in (or alternatively, coupled to) protection controller 205 is operable to provide data validation functionality for data being written to—and/or data being read from—memory 211. Integrity engine 207 is implemented, for example, on the memory path or memory bus to allow validation of data transmitted to and from, and/or stored on, memory 211. In some embodiments, for example, integrity engine 207 performs calculations, based on data which has been (or is to be) written to memory 211, to generate integrity information corresponding to said data. The integrity information—e.g., comprising a hash, checksum, or other such value based on the data—is stored for later use as a reference in determining whether the data has been modified without authorization. By way of illustration and not limitation, the integrity information is stored, in some embodiments, in the same line in memory as the data to which the integrity information corresponds—e.g., in metadata bits associated with the data line.

Based (for example) on a currently configured mode of protection controller 205, integrity engine 207 is able to further perform an evaluation of data which is being read from memory 211—e.g., the evaluation based on integrity information which is associated with said data. In some embodiments, for example, the integrity information is stored at, or otherwise associated with, a memory location from which the corresponding data is retrieved. The integrity information is based on an earlier-in-time version of said data, and is available for use to detect an unauthorized modification (if any) of the data. For example, other integrity information (e.g., a hash, checksum or other such value) is calculated, in some embodiments, based on the data which has been read from memory 211—e.g., where such other integrity information is then compared to the previously-determined integrity information, which has also been read from memory 211, to detect for an unauthorized data modification. In some embodiments, calculations by integrity engine 207 to generate integrity information and/or to evaluate the validity of data based on such integrity information include one or more operations adapted from any of a variety of conventional data validation techniques, which are not detailed herein to avoid obscuring certain features of various embodiments.

In some embodiments, integrity engine 207 is variously configured, programmed or otherwise operated to support any of multiple operational modes including a GV mode and a GNV mode. For example, control circuitry coupled to, or included in, operate integrity engine 207 is configured or programmed (e.g., by software) to selectively provide, for different pages and/or other domains of memory 211, any of various combinations of data validation functionality. In this manner, data validation can be selectively enabled/disabled separately for different users, tenants, customers, applications, and/or workloads.

By way of illustration and not limitation, reference information and/or other configuration state of protection controller 205—e.g., including the illustrative key table 208 shown—is used to define various domains of memory 211 that are separately configured each to have a respective degree and/or type of protection using data validation functionality. In some embodiments, for example, a "domain" is viewed as a collection of resources associated with a particular workload (e.g., a workload of a particular user or application), and may include any regions of memory containing data associated with the workload. For example, a protected domain for a workload of a cloud (or other) service provider includes resources (e.g., memory) associated with an operating system (O/S), virtual machine (VM) (e.g., a VM running on a virtual machine manager (VMM)), and/or any ring-3 applications running on the O/S or VM.

Protection controller 205 may maintain key table 208 (or other such configuration state) to identify, for each of one or more domains of memory 211, a respective currently configured operational mode of multiple possible operational modes which, for example, are predicated upon an availability of various services to be selectively permitted or prevented with respect to a given memory domain. For example, such services—including a first service to calculate integrity information, and a second service to evaluate a validity (or invalidity) of data based on such integrity information—are made available due to a global GV mode which has been configured after a global GNV mode. In an embodiment, such a global GNV mode is a default mode configured by a BIOS during a boot-up sequence, for example. The multiple possible operational modes include a GV mode—e.g., wherein, based on key table 208, integrity engine 207 is operated to selectively provide functionality to evaluate an integrity of data. In some embodiments, another mode prevents both the generation of integrity information and the evaluating of data validity based on such integrity information.

Controller circuitry of protection controller 205—e.g., including the illustrative microcontroller μC 209 shown—is coupled to access key table 208 and to configure integrity engine 207 to implement an indicated operational mode. Such configuring may transition integrity engine 207 between a GNV mode and a GV mode (e.g., where said modes are each with respect to data validation protection for at least one domain of memory 211). In some embodiments, μC 209 (or other such logic of protection controller 205) updates key table 208—e.g., responsive to communications from processor 202 which, over time, variously reconfigure operational modes each for protection of a respective memory domain. For example, μC 209 provides functionality to service a configuration command from processor 202, where said configuration command includes or is otherwise based on platform configuration instruction 224.

For example, in some embodiments, protected domains are able to be defined and/or configured using a processor instruction implemented by processor 202, such as a "platform configuration" (PCONFIG) instruction described herein. The PCONFIG instruction, for example, enables the defining and/or configuring of a protected domain by programming a new entry—or by modifying an existing entry—in key table 208 of protection controller 205. In this manner, protected domains can be defined and configured programmatically (e.g., by management software) using the PCONFIG instruction. In some embodiments, a PCONFIG instruction supports various leaf functions for configuring and managing protected domains. When the PCONFIG instruction is executed, for example, the particular leaf function to invoke may be specified in a hardware register (e.g., the EAX register). In some embodiments, the parameters used by a particular leaf function may also be specified in hardware registers (e.g., the RBX/RCX/RDX registers).

In some embodiments, data validation protections of computer device 200 are discovered and configured using processor instructions and/or hardware registers. For example, in some embodiments, a processor instruction is used to determine whether certain memory protections are supported by computer device 200—e.g., where a CPU identification (CPUID) instruction is used by software to identify the capabilities of a particular processor.

Upon determining that data validation memory protection is supported by computer device 200, an accessibility of data validation is then enabled, disabled or otherwise configured using hardware registers, such as control registers 226 of processor 202. In some embodiments, for example, control registers 226 include various model-specific registers (MSRs) that allow software to discover, enable, disable or otherwise configure the data validation functionality of computer device 200. In some embodiments, control registers 226 includes a data validation capability register, a data validation activation register, and/or one or more data validation exclusion registers, as described further herein. Control registers 226 define or otherwise indicate a current state of data validation functionality which is enabled (or disabled) by protection controller 205 according to key table 208.

By selectively providing functionality of integrity engine 207 based on key table 208, protection controller 205 variously (and independently) allows or prevents data validation for different domains of memory 211. In this manner, a workload to be serviced with non-enlightened (e.g., legacy) software avails of encryption/decryption protections without experiencing certain data validation errors. Such errors might otherwise occur, for example, as a result of various conflicts between legacy encryption/decryption memory protections and data integrity mechanisms which have developed in recent years. Alternatively or in addition, the same workload (or another workload) may avail of enlightened software's ability to effectively implement both data validation protections and encryption/decryption protections.

Although some embodiments are not limited in this regard, data validated with integrity engine 207 is an encrypted version of data which has been (or is to be) communicated between processor 202 and system agent 204—e.g., wherein memory 211 stores the encrypted version of said data. For example, in some embodiments, protection controller 205 further comprises (or alternatively, is coupled to) a cryptographic engine 206 for providing memory encryption to protect data stored on memory 211. In some embodiments, for example, cryptographic engine 206 is implemented on the memory path or memory bus to allow encryption of data transmitted to and from, and/or stored on, memory 211. Moreover, cryptographic engine 206 provides support for multiple encryption keys, and is configurable or programmable, in some embodiments. For example, cryptographic engine 206 is able to be configured or programmed (e.g., by software) to encrypt different regions or pages of memory 211 using different encryption keys and/or algorithms. In this manner, memory encryption can be provided and configured separately for different users, tenants, customers, applications, and/or workloads.

Cryptographic engine 206 and/or integrity engine 207 is implemented with circuit logic comprising any of a variety of suitably configured hardware, firmware and/or executing software. In some embodiments, cryptographic engine 206 and/or integrity engine 207 is integrated with circuit logic of μC 209—e.g., wherein circuitry of μC 209 is to selectively enable or disable functionality of cryptographic engine 206 and integrity engine 207, on a per-domain basis, based on a configuration which is defined at least in part with key table 208. For example, in some embodiments, protection controller 205 is used to define various secured or protected domains that can be separately configured and protected using memory encryption. Using cryptographic engine 206, protection controller 205 allows the protected domains to be configured and protected separately, thus allowing each protected domain to be cryptographically isolated in memory by encrypting its associated code and/or data with a unique encryption key. In this manner, the workloads of different users, customers, and/or tenants can be cryptographically isolated by defining different protection domains for the various workloads.

In some embodiments, the encryption/decryption memory protection of computer device 200 is discovered and configured using processor instructions and/or hardware registers. For example, in some embodiments, a processor instruction is used to determine whether encryption/decryption memory protection is supported by computer device 200, such as a CPU identification (CPUID) instruction used by software to identify the capabilities of a particular processor. Upon determining that encryption/decryption memory protection is supported by computer device 200, accessibility of the encryption/decryption memory protection is then enabled, disabled or otherwise configured using hardware registers, such as control registers 226 of processor 202. In an example embodiment, registers of processor 202 (e.g., including one or more of control registers 226, for example) include various model-specific registers (MSRs) that allow software to discover, enable, and/or configure the encryption/decryption memory protection capabilities of computer device 200.

In the illustrated embodiment, protection controller 205 maintains an internal domain key table 208 to identify protections for respective domains that have been configured in system 200. The key table 208 is implemented using any of various forms of memory or storage (e.g., RAM)—e.g., directly on protection controller 205, in memory 211, and/or using another memory component. As shown in FIG. 2B, entries of domain key table 208 (e.g., including the illustrative entries 208a-d shown) each correspond to a different respective memory domain. For example, each entry 208a-d includes an identifier (Key ID) of a corresponding domain, and a respective mode of protection for said domain. In a Key ID field of key table 208, a particular domain is indicated, for example, by an identifier of a key which is used to determine, at least in part, a memory location of said domain.

For example, FIG. 2C shows one example of a format 230 of physical address information for a given data line in a memory such as memory 211. In some embodiments, a Key ID represents the higher order bits of the memory addresses that are within the associated protected domain. For example, in format 230, an upper 3 bits of 39-bit address information include a KeyID value which specifies a domain to which the corresponding data line belongs. In such an embodiment, a lower 36 bits of such 39-bit address information specify an address of the corresponding data line within said memory domain. Accordingly, the protected domain associated with such a key ID covers all memory addresses whose highest order 3 bits match the key ID. The particular size and arrangement of the domain identifier and address fields in format 230 are merely illustrative, and other embodiments include other sizes and/or arrangements of said fields, or include additional fields. In the illustrated embodiment, the key ID is stored as a field in key table 208, but in alternative embodiments, the key ID is used as an index into key table 208 rather than being stored directly in key table 208.

Using key table 208, multiple protection modes are supported, and memory domains are variously protected (or alternatively, at least partially unprotected) each based on a respective one of said multiple protection modes. The supported protection modes include a GV mode, in some embodiments. For example, a Mode field of an entry in key table 208 defines or otherwise indicates a type of data validation functionality which is to be enabled (or disabled) for the memory domain corresponding to said entry.

For example, in the illustrated example, domain key table 208 includes four entries. For each of entries 208a through 208d, a Mode field of the entry identifies a domain-specific (or "local") mode of protection services for accesses to the memory domain which corresponds to said entry. This local mode is configured, for example, by a respective operating system or other non-BIOS process—e.g., after a BIOS configures a global mode which makes a data validation service available for use in any memory domain. In some embodiments, for example, a system boot up includes a BIOS configuring a global GNV mode which prevents a data validation service for accesses to any domain of a memory. Identification of a global protection mode is provided by key table 208 or, alternatively, by another register, table, or other such data structure.

Subsequently, enlightened software (e.g., including an operating system) is able to communicate a platform configuration instruction to configure a global GV mode which makes the data validation service available for memory accesses. However, applicability of this global GV mode to a particular memory domain is subject to selective restriction on a local (domain-specific) level—e.g., according to the mode indicated by a give Mode field of entries 208a through 208d. For example, the Mode field specifies or otherwise indicates a domain-specific mode to provide any of a variety of combinations of protection services including an encryption/decryption service, a service to generate integrity information, and a service to evaluate data validity based on integrity information.

In the example embodiment shown, the first entry 208a of key table 208 identifies a first memory domain, corresponding to key ID 000 (thus covering all memory addresses that contain 000 in the highest order 3 bits), as being provided memory protection functionality of a local GV mode which also supports encryption/decryption protection. A second entry 208b identifies a second memory domain, corresponding to key ID 001 (thus covering all memory addresses that contain 001 in the highest order 3 bits), as being provided encryption/decryption protection functionality, but not any service(s) to generate integrity information or evaluate data validity. A third entry 208c identifies a third memory domain, corresponding to key ID 010 (thus covering all memory addresses that contain 010 in the highest order 3 bits), as being provided memory protection functionality of a local GV mode which also supports encryption/decryption protection. A fourth entry 208d identifies a fourth memory domain, corresponding to key ID 011 (thus covering all memory addresses that contain 011 in the highest order 3 bits), as being provided encryption/decryption protection functionality, but not any service(s) to generate integrity information or evaluate data validity. The particular number of memory domains shown in key table 208, and the particular memory protection modes variously assigned to said domains, is merely illustrative, and not limiting on some embodiments.

Although some embodiments are not limited in this regard, key table 208 (or other configuration state of protection controller 205) is able to further identify a correspondence of cryptographic keys each with a respective memory domain. By way of illustration and not limitation, entry 208a further identifies the first memory domain (corresponding to key ID 000) as being provided with encryption/decryption protection using an encryption key ABC. Furthermore, entry 208b identifies the second memory domain (corresponding to key ID 001) as being provided with encryption/decryption protection using an encryption key LMN—e.g., wherein entry 208c further identifies the third memory domain (corresponding to key ID 010) as being provided with encryption/decryption protection using an encryption key XYZ. Further still, entry 208d identifies the fourth memory domain (corresponding to key ID 011) as being provided with encryption/decryption protection using an encryption key PQR. In other embodiments, key table 208 omits any such cryptographic key information.

Figure 3:
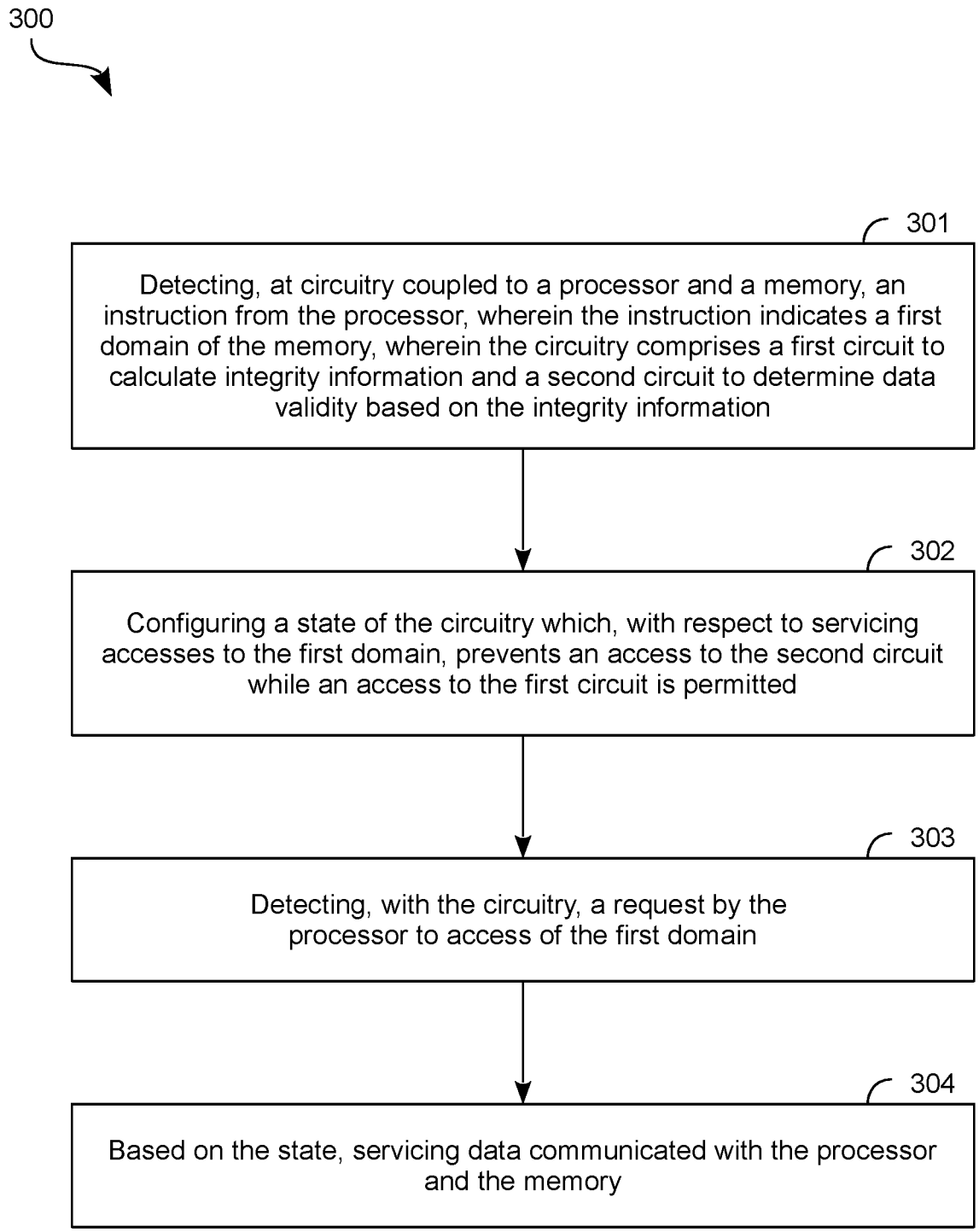
FIGS. 3 and 4 illustrate flowcharts each for a respective method to configure a data protection functionality of circuitry according to a corresponding embodiment.

FIG. 3 shows features of a method 300 to configure one or more memory protection mechanisms according to an embodiment. In some embodiments, method 300 is performed with one or more servers 120 or with circuitry of computer device 200 (e.g., at protection controller 205). In an embodiment, method 300 is performed with circuitry, coupled to a processor and a memory, which includes a first circuit which is to calculate integrity information—e.g., including a hash, checksum or other suitable fiducial value (s)—based on data communicated with the processor and the memory. Such circuitry further comprise a second circuit which is to determine a validity of some data based on such integrity information. For example, the circuitry provide functionality of integrity engine 207 and, in some embodiments, circuit logic (such as µC 209) which is operable to variously configure such functionality. The circuitry further provides functionality of cryptographic engine 206, in some embodiments.

As shown in FIG. 3, method 300 may include (at 301) detecting at the circuitry an instruction (e.g., a platform configuration instruction PCONFIG), from the processor, which indicates a first domain of the memory. In some embodiments, the processor and/or the circuitry include or otherwise have access to respective reference information (or other such configuration state) which describes multiple domains of the memory. Such reference information further specifies or otherwise indicates, for each domain of the multiple domains, a respective one or more services which are to be applied to data which is read from, or is to be written to, the domain. Accordingly, the reference information (e.g., provided with key table 208 and/or control registers 226) is used to determine a current configuration of the circuitry, and/or is updated to change said configuration.

For example, the instruction detected at 301 specifies or otherwise indicates—e.g., per the defined instruction 224—a particular combination of memory protection mechanisms which are to be variously applied, or not applied, with respect to memory accesses to the first domain. In an example embodiment, the instruction is generated by IS codec 222 (or other such logic) in response to a software process executing with execution unit 220. Based on the instruction detected at 301, method 300 (at 302) configures a state of the circuitry. The state includes a GNV mode with respect to the first domain—e.g., wherein, with respect to servicing accesses to the first domain by the processor, the state is to prevent an access to the second circuit (which provides a service to validate data based on integrity information) while an access to the first circuit (which provides a service to calculate integrity data) is permitted.

In some embodiments, the state configured at 302 corresponds multiple domains of the memory each with a respective one of a first operational mode of the circuitry or a second operational mode of the circuitry. The first mode and the second mode are, respectively, a GNV mode and a GV mode. In some embodiments, the modes are each domain-specific—e.g., where applicability of a given mode is with respect to accesses to a respective domain (if any) which—at a given time—corresponds to said mode. For example, with respect to servicing accesses to a domain to which the first mode corresponds, the first mode includes an access to the second circuit being prevented while an access to the first circuit is permitted. By contrast, with respect to servicing accesses to a domain to which the second mode corresponds, the second mode includes respective accesses to the first circuit and the second circuit both being permitted—e.g., to provide both a first service which is to generate integrity information and a second service which is to perform data validation based on such integrity information. In one such embodiment, the state configured at 302 corresponds the first domain to the first mode and corresponds some other domain of the multiple domains to the second mode.

In some embodiments, method 300 includes additional operations (not shown) to change a mode by which accesses to a particular domain are to be provided with, or not provided with, data validation services. In an embodiment, the state configured at 302 is a first state which corresponds the first domain to a first (GNV) mode. In one such embodiment, method 300 further comprises the circuitry further receiving a second instruction from the processor, where the second instruction is to set a second state of the circuitry, wherein the second state corresponds the first domain to the second mode. Based on such a second instruction, the circuitry transitions between the first state and a second state which, instead, corresponds the first domain to a second (GV) mode. Accordingly, different memory domains are variously provided each with a respective combination of one or more data validation services.

In some embodiments, a default state of the circuitry—e.g., configured with a BIOS or other such logic at a system boot up—corresponds multiple domains of the memory each with the first mode. Such a default state enables enlightened software to "opt in" to a data validation service, while allowing non-enlightened software to avoid false data integrity errors. For example, enlightened software is able to issue an explicit request (using an instruction of an ISA supported by the processor) for a GV mode to be configured for a memory domain used by the enlightened software.

In some embodiments, method 300 additionally or alternatively comprises operations wherein the circuitry performs one or more protection services according to a state such as that configured at 302. For example, method 300 comprises (at 303) detecting, with the circuitry, a request by the processor to access the first domain, and (at 304) servicing data communicated with the processor and the memory—e.g., wherein the servicing is based on the state and the request. By way of illustration and not limitation, the request detected at 303 may be to write data to the first domain—e.g., wherein the servicing at 304 includes calculating a hash, checksum or other integrity information based on such data. Such calculating of integrity information is permitted (e.g., not disabled or otherwise prevented) while either a GNV mode or a GV mode of the circuitry is configured with respect to the first domain. Alternatively, the request detected at 303 may be to read data from the first domain. In such a scenario, the servicing may include only operations other than an evaluation (based on previously-calculated integrity information) of the validity of such data. For example, in some embodiments, the servicing includes a cryptographic operation (such as a decryption) of said data—e.g., wherein the cryptographic operation comprises a multi-key cryptographic operation.

In some embodiments, a corresponding method is performed at a processor—e.g., at processor 202—to facilitate a state such as that which is configured at 302. Such a method includes the processor accessing a memory while an integrated circuit (e.g., providing functionality of protection controller 205) is coupled both to the processor and to the memory. Such an integrated circuit supports services such as the first service and second service described herein with reference to method 300. In such an embodiment, the method further comprises the processor communicating to the integrated circuit an instruction (such as that detected at 301) which indicates a first domain of the memory, wherein the instruction sets a configuration of the integrated circuit. The configuration includes, for example, a GNV mode for accesses to the first domain—e.g., wherein, with respect to servicing accesses to the first domain by the processor, the configuration prevents the second service while the first service is permitted.

Figure 4:
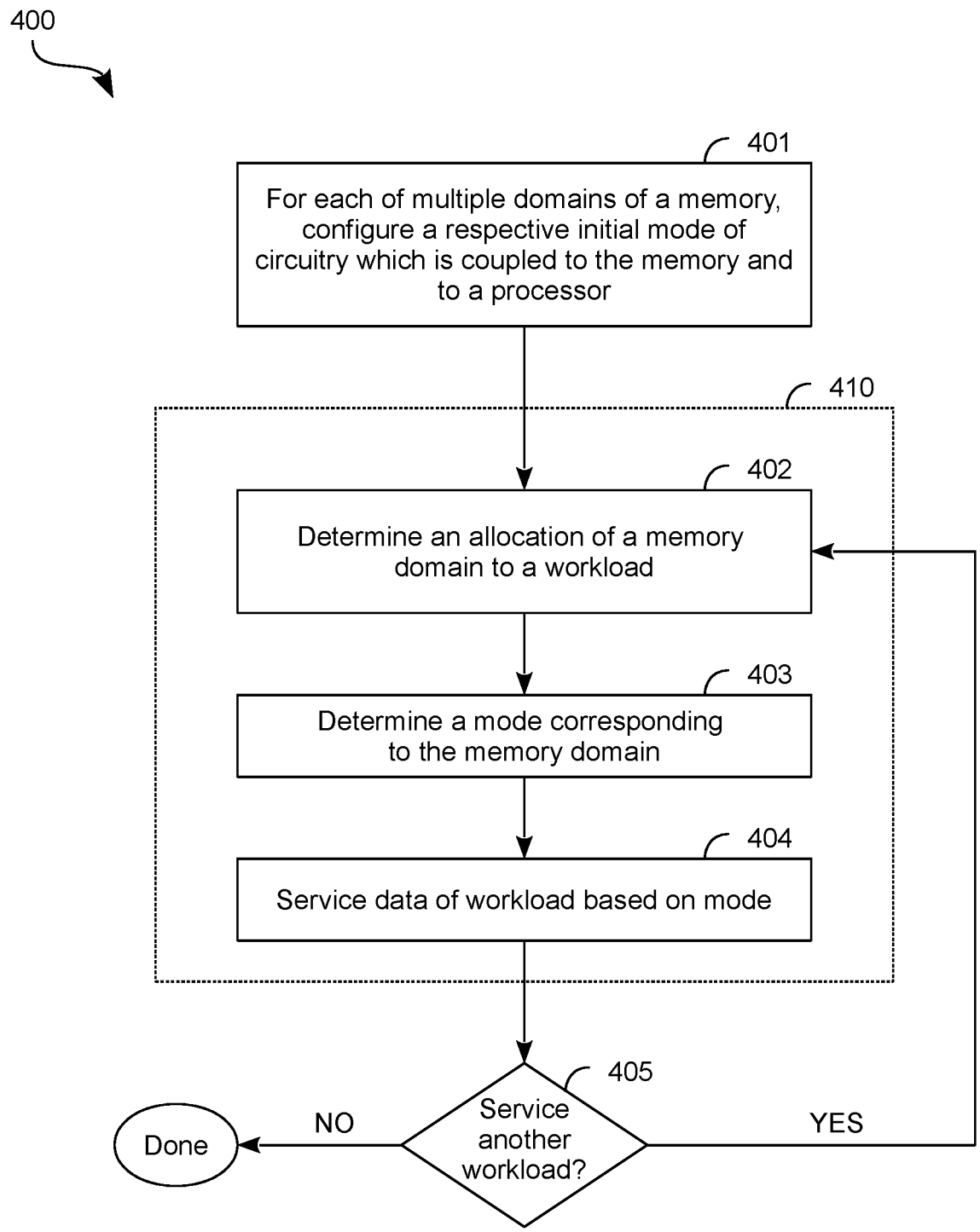

FIG. 4 shows features of a method 400 to facilitate a servicing of data with one or more protection functionalities according to an embodiment. Method 400 includes some or all of the features of method 300, for example. Method 400 is performed with circuitry which provides functionality of the one or more servers 120, or of computer device 200. In some embodiments, a computer platform includes a processor, a memory, and circuitry variously coupled to the processor and memory—e.g., where such circuitry performs method 400 to configure a selective provisioning of memory protection services. The circuitry and/or the processor include or otherwise have access to respective reference information (or other such configuration state) which defines different domains of the memory. Operations of method 400 variously corresponds such domains each with a respective mode of provisioning one or more memory protection services.

For example, method 400 comprises (at 401) the circuitry configuring, for each domain of multiple domains of the memory, a respective initial mode of the circuitry. The respective modes include a GNV mode or a GV mode (such as the first mode and second mode, respectively, which are described herein with reference to method 300). In one such embodiment, the providing at 401 includes or is otherwise based on a BIOS (or other suitable system startup logic of the computer platform) implementing a default configuration of the circuitry, wherein a GNV mode is associated with each memory domain—e.g., based on signaling to boot up the computer platform. This default configuration enables legacy software to avail of an encryption/decryption service without triggering certain errors associated with a data validation service. Alternatively or in addition, enlightened software is able to generate or otherwise cause the communication of an instruction to configure a data validation service for accesses to a memory domain which is allocated to said enlightened software.

In some embodiments, method 400 additionally or alternatively includes operations 410 to configure (e.g., reconfigure) one or more modes each to use, or forego using, memory protection functionality for accesses to a corresponding memory domain. Operations 410 include some or all of method 300, in some embodiments. Operations 410 include (at 402) determining an allocation of a memory domain to a workload—e.g., including performing the allocation in preparation for a software process being executed using the memory domain. In some embodiments, processor 202 executes or operates in response to a management process (e.g., a virtual machine manager) which selects the memory domain for use by a particular software process. Processor 202 accesses information—in control registers 226, for example—which specifies or otherwise indicates various domains of memory 211. Alternatively or in addition, control logic of protection controller 205 (e.g., including μC 209) is able to access information in key table 208 to specify or otherwise determine such domains.

In an embodiment, operations 410 further comprise (at 403) determining a mode corresponding to the memory domain which is allocated to said workload. The determining at 403 includes providing (or detecting) an instruction from the processor, where the instruction indicates the memory domain and a memory protection mode which is to be corresponded with the domain. Such an instruction indicates that the memory domain is to be corresponded with a memory protection mode other than one which currently corresponds to said memory domain. For example, in some embodiments, the determining at 403 includes the instruction transitioning the circuitry between a first configuration wherein a GNV mode is to be used for servicing accesses to the domain, and a second configuration wherein a GV mode is to be used for servicing accesses to the domain.

Such a transition includes a reconfiguration of integrity engine 207 (or other such logic) to service the domain according to a GV, or other, mode. Reference information is updated to reflect this reconfiguration—e.g., wherein such reference information includes control registers 226 and/or key table 208 (for example).

Subsequently, method 400 (at 404) services data of the workload based on the mode which is determined at 403. For example, the circuitry is able to detect a request from the processor to access the memory—e.g., where data, communicated from one of the processor or the memory, is included in the access request or provided in response to the access request. The servicing at 404 includes, for example, performing a cryptographic process (e.g., an multi-key encryption or decryption) based on the data. Where the mode determined at 403 is a GNV mode, method 400 foregoes communicating to the processor an error message based on the detection (if any) of an invalidity of the data.

During or after operations 410, method 400 detects (at 405) whether another workload is to be serviced using resources of the memory and/or the processor. Where no additional servicing of another workload is needed, method 400 ends (or alternatively, continues the servicing 404 of one or more currently executing workloads). However, where the evaluating at 405 determines that some other workload is to be serviced, method 400 performs a different sequence of operations 410—e.g., to allocate a corresponding memory domain, to determine a protection mode for said memory domain, and to service data of the workload according to the protection mode.

Figure 5A:
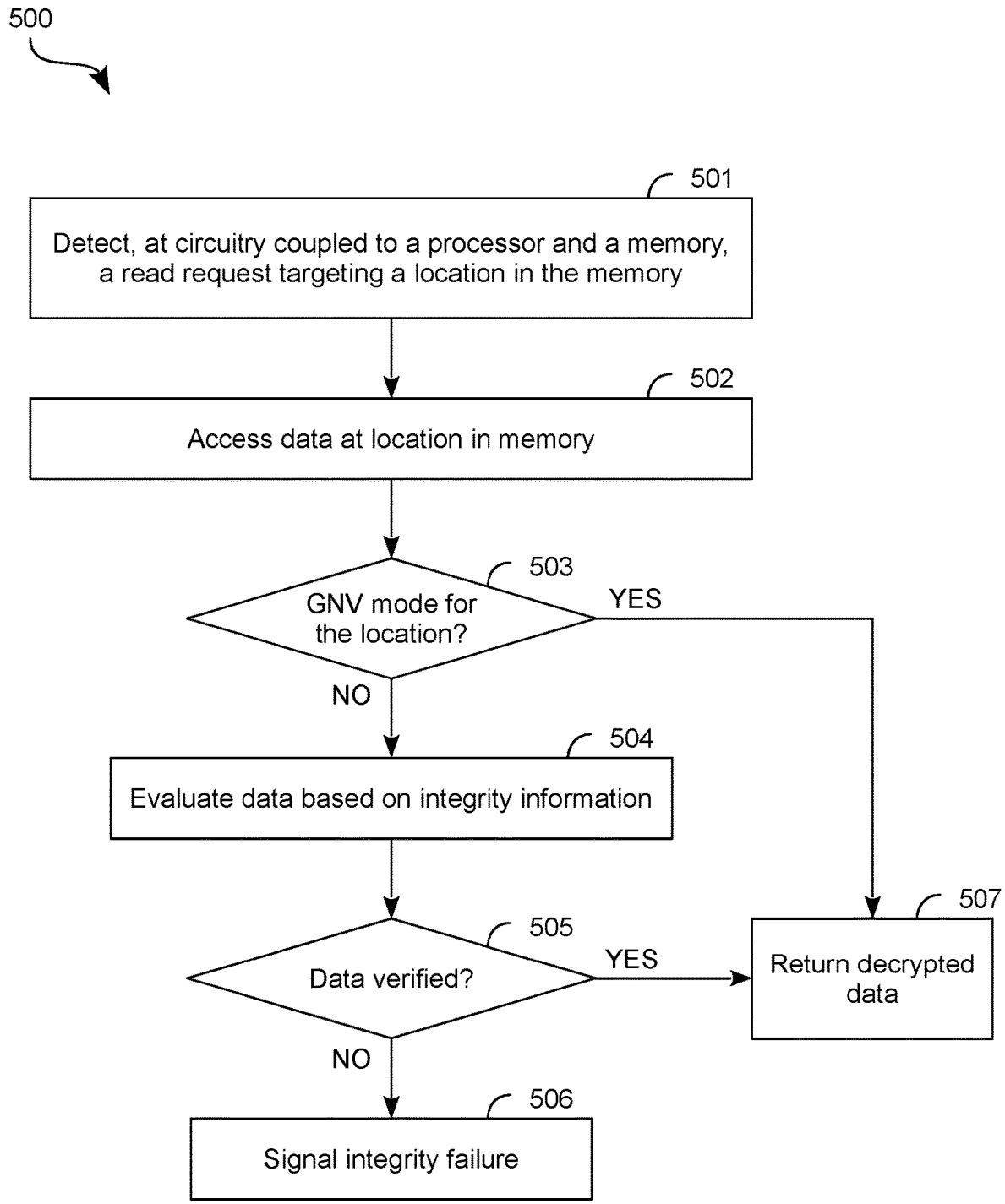
FIG. 5A illustrates a flowchart for a method to selectively provide data validation functionality according to an embodiment.

FIG. 5A illustrates features of a method 500 for servicing a memory access according to a preconfigured mode. Method 500 is implemented, in some embodiments, using the embodiments and functionality described throughout this disclosure. In an embodiment, method 500 is performed at circuitry which provides functionality of protection controller 205—e.g., based on the state configured at 302 of method 300, or based on the mode determined at 403 of method 400.

Method 500 begins (at 501) by the circuitry detecting a read request which targets a location in a memory. The read request is provided by a processor—e.g., wherein circuitry which performs the detecting at 501 is coupled to each of the memory and the processor. With respect to accesses to a memory domain which includes the targeted location, such circuitry is configured to provide a particular one or more protection services (e.g., and to forego providing one or more other available protection services).

For example, in response to the detecting at 501, method 500 (at 502) accesses data from the targeted memory location, the accessing with the circuitry coupled to the processor and the memory. In some embodiments, the accessing at 502 further comprises accessing previously-calculated integrity information (e.g., a hash or a checksum) which is stored at, or otherwise corresponds to, the targeted memory location. Such integrity information is available to be used (conditional upon a currently-configured protection mode) to evaluate a validity of the data accessed at 502. Alternatively, a currently-configured protection mode may prevent the retrieval of such integrity information—e.g., where the protection mode is to forego any data validity evaluation.

By way of illustration and not limitation, method 500 further comprises determining (at 503) whether a GNV mode is currently configured for a memory domain targeted by the read request detected at 501. Where it is determined at 503 that a GNV mode currently corresponds to the targeted memory domain, method 500 (at 507) returns a decrypted version of the data to the processor—e.g., independent of any evaluation of a validity of the data. However, where it is instead determined at 503 that no such GNV mode currently corresponds to the targeted memory domain, method 500 (at 504) performs an evaluation of the data based on previously-determined integrity information corresponding to said data. The evaluating at 504 includes operations which, for example, are adapted from any of a variety of data validation (e.g., error checking) techniques, which are not detailed herein to avoid obscuring certain features of various embodiments.

Method 500 further comprises determining (at 505) whether the evaluating at 504 indicates a validity of the data accessed at 502. Where it is determined at 505 that such data is valid, method 500 (at 507) returns a decrypted version of the data to the processor. However, where it is instead determined at 505 that such data is invalid, method 500 (at 506) signals to the processor a data validity error message indicating a failure of the integrity evaluation at 504.

Figure 5B:
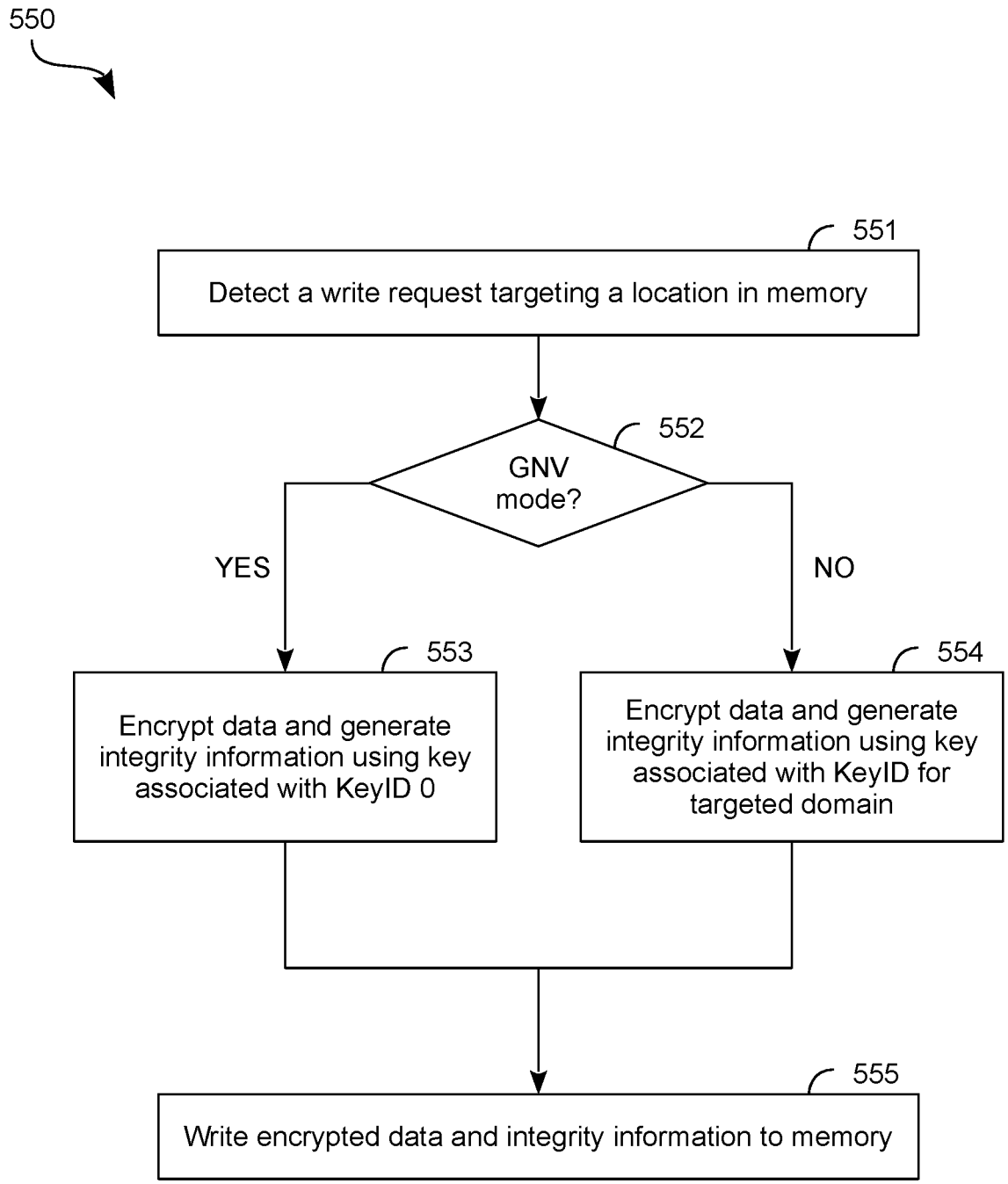
FIG. 5B illustrates a flowchart for a method to perform a write operation based on a protection mode configured according to an embodiment.

FIG. 5B illustrates features of a method 550 for servicing a memory access according to a preconfigured mode. Method 550 is implemented, in some embodiments, using the embodiments and functionality described throughout this disclosure. Method 550 is performed by circuitry which provides functionality of protection controller 205, for example.

Method 550 begins (at 551) by detecting a write request which targets a location in a memory. The write request includes or is otherwise associated with data which is provided by a processor—e.g., wherein circuitry which performs the detecting at 551 is coupled to each of the memory and the processor. Such circuitry is configured to provide one or more protection services with respect to accesses to the memory. In one embodiment, for example, a GV mode is configured, making available both a first service to calculate integrity information, and a second service to evaluate a validity (or invalidity) of data based on previously-calculated integrity information. Alternatively, a GNV mode may be configured, making available the first service, but preventing an availability of the second service.

In response to the detecting at 551, method 550 (at 552) determines whether a GNV mode is currently configured—e.g., where the GNV mode is global and applies to all domains of the memory, including one targeted by the write request. Where it is determined at 552 that a GNV mode currently applies to accesses to the targeted memory domain, method 550 (at 553) encrypts the data of the write request and generate integrity information—e.g., including a message authentication code—for the data. Based on the configuration of a GNV mode, the integrity information generated at 553 is further based on a key which is associated with a platform key identifier—i.e., regardless of what particular memory domain is targeted by the write request. Generation of such integrity information based on a platform key identifier helps avoid integrity error messages where, for example, software moves a page of data from a first memory domain (e.g., corresponding to the platform key identifier) to a different memory domain, and then back to the first domain during a GNV mode.

Where it is instead determined at 552 that a GNV mode is not configured (e.g., where a global GV mode is configured), method 550 (at 554) encrypts the data of the write request and generate integrity information for the data. Based on the absence of a configured GNV mode, the integrity information generated at 554 is further based on a key which is associated with another key identifier for a memory domain targeted by the write request. After the encrypting and generating of integrity information (at 553, or 554), method 500 may, at 555, write the encrypted data and integrity information to memory.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-6B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB)

636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
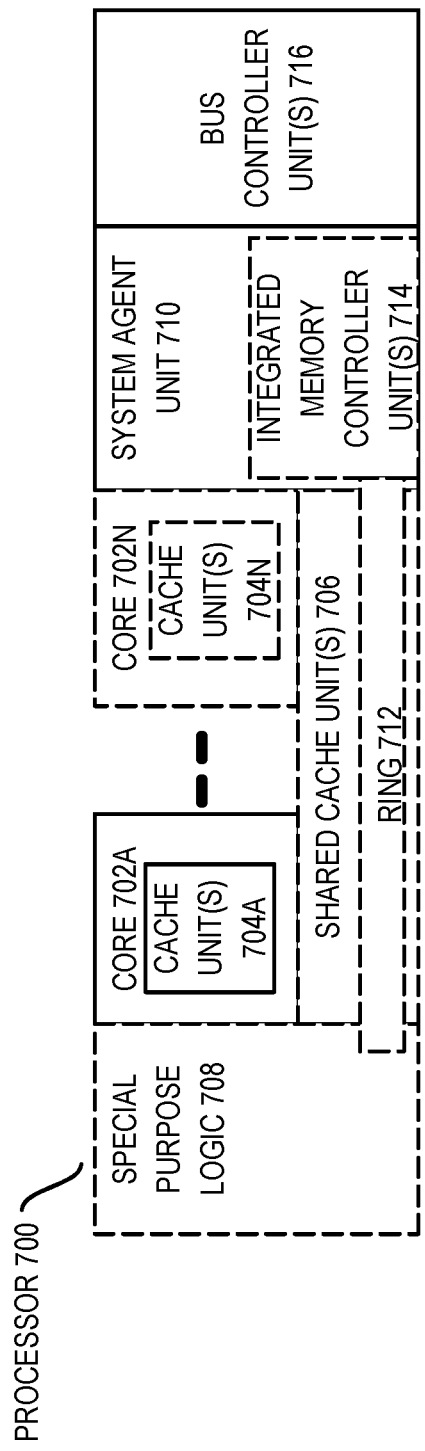
FIG. 7 is a block diagram of a processor that may have more than one core, may have an integrated memory controller, and may have integrated graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general-purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702A-N.

In some embodiments, one or more of the cores 702A-N are capable of multithreading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Figure 8:
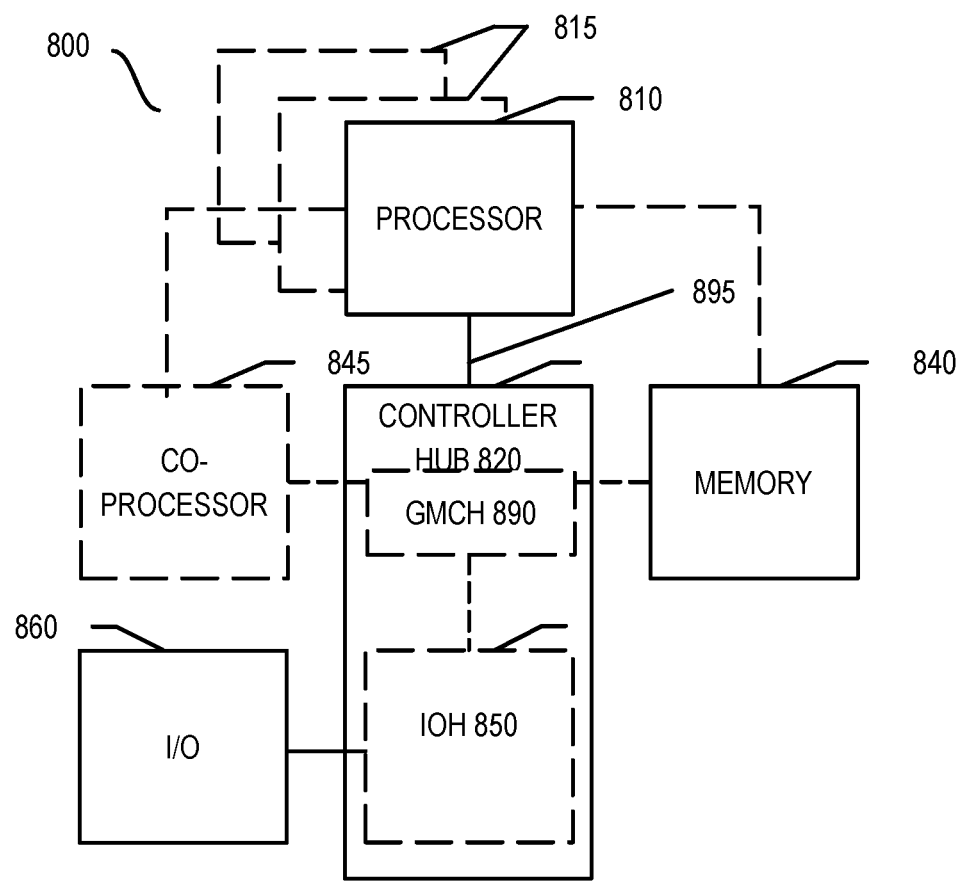
FIGS. 8 through 10 are block diagrams of exemplary computer architectures.
Figure 9:
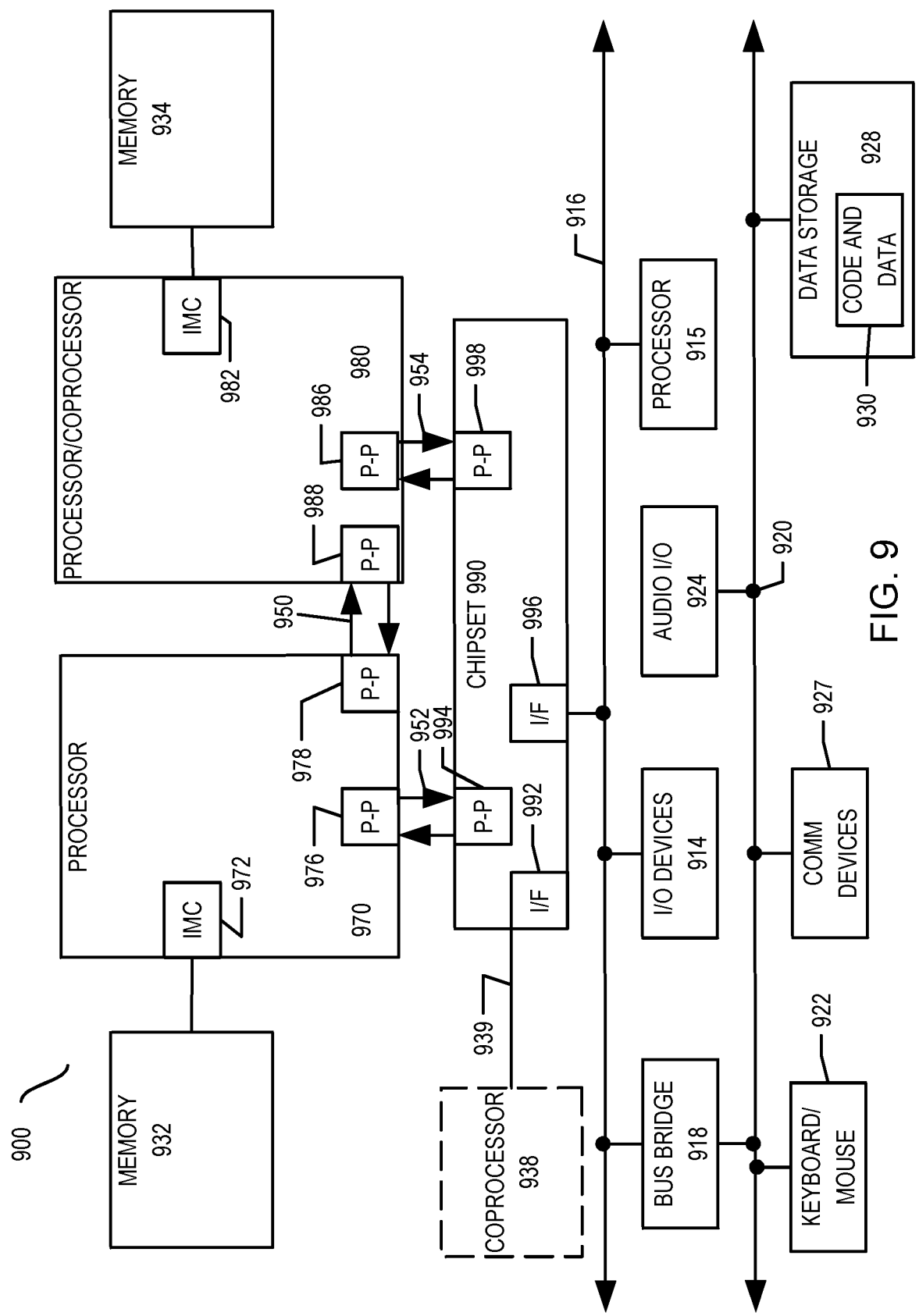
Figure 10:
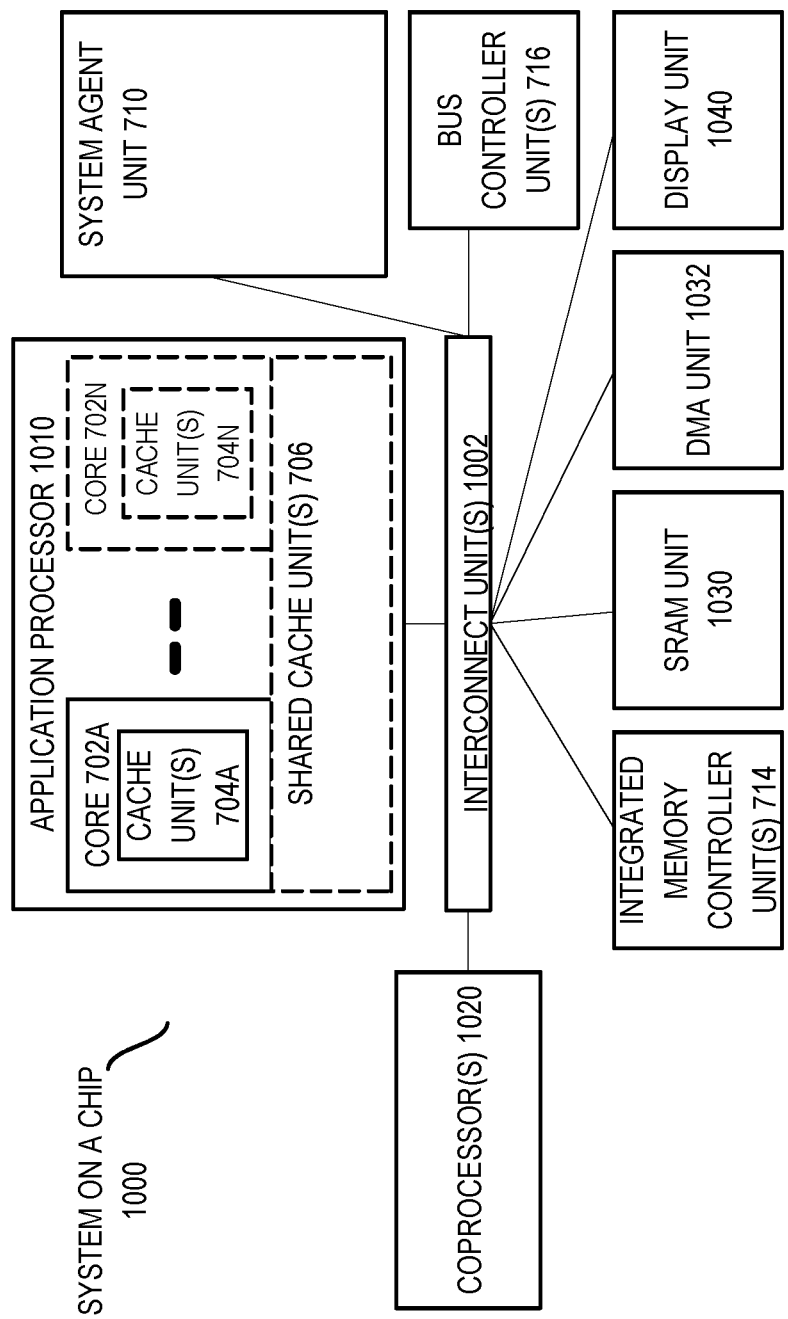

FIGS. 8-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller unit's point-to-point (P-P) interfaces 976 and 978; similarly, second processor 980 includes P-P interfaces 986 and 988.

Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via an interconnect 939 and a high-performance interface 992. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Referring now to FIG. 10, shown is a block diagram of a SoC 1000 in accordance with an embodiment of the present invention. Similar elements in FIG. 7 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 706; a system agent unit 710; a bus controller unit(s) 716; an integrated memory controller unit(s) 714; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Techniques and architectures for providing data protection mechanisms are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit comprising:
   first circuitry to couple to a processor and to a memory, the first circuitry comprising:
      a first circuit to detect a request by the processor to write data to the memory and, based on the request, to perform a calculation with the data to generate integrity information; and
      a second circuit to determine a validity of a version of the data based both on the integrity information and another request by the processor to read the data from the memory; and
   second circuitry coupled to the first circuitry, the second circuitry to:
      detect a command from the processor, wherein the command comprises an indication of a first domain of the memory; and
      transition the first circuitry to a state based on the indication, wherein the state is to:
         enable the first circuit to generate first integrity information based on first data which is successfully written to the first domain during the state; and
         prevent an access by the second circuit to second data which is successfully read from the first domain during the state, the access to determine a validity of the second data.

2. The integrated circuit of claim 1, wherein the state corresponds multiple domains of the memory each with a respective one of:
   a first mode, wherein, with respect to a domain to which the first mode corresponds, the first mode is to:
      enable the first circuit to generate respective integrity information based on respective data which is successfully written to the corresponding domain during the state; and
      prevent an access by the second circuit to respective data which is successfully read from the corresponding domain during the state, the access to determine a validity of the respective data; or
   a second mode, wherein, with respect to a domain to which the second mode corresponds, the second mode is to:
      enable the first circuit to generate respective integrity information based on respective data which is successfully written to the corresponding domain during the state; and
      enable an access by the second circuit to respective data which is successfully read from the corresponding domain during the state, the access to determine a validity of the respective data.

3. The integrated circuit of claim 2, wherein the state corresponds the first domain to the first mode and corresponds a second domain of the multiple domains to the second mode.

4. The integrated circuit of claim 2, wherein the state is a first state which corresponds the first domain to the first mode, wherein the second circuitry is further to:
   receive another command from the processor; and
   transition the first circuitry between the first state and a second state based on the other command, wherein the second state corresponds the first domain to the second mode.

5. The integrated circuit of claim 2, wherein a default state of the integrated circuit corresponds multiple domains of the memory each with the first mode.

6. The integrated circuit of claim 1, further comprising third circuitry to perform a cryptographic operation on data being communicated with the processor and the memory.

7. The integrated circuit of claim 6, wherein the cryptographic operation comprises a multi-key cryptographic operation.

8. A processor comprising:
first circuitry to execute a software process while integrated circuitry is coupled between the processor and a memory, wherein the integrated circuitry comprises both a first circuit to perform a calculation, based on a request to write data to the memory, to generate integrity information with the data, and a second circuit to determine a validity of a version of the data based on both the integrity information and another request to read the data from the memory; and
second circuitry, responsive to the software process, to communicate to the integrated circuitry a command which indicates a first domain of the memory, the command to transition the integrated circuitry to a state based on the indication, wherein the state is to:
enable the first circuit to generate first integrity information based on first data which is successfully written to the first domain during the state; and
prevent an access by the second circuit to second data which is successfully read from the first domain during the state, the access to determine a validity of the second data.

9. The processor of claim 8, wherein the state corresponds multiple domains of the memory each with a respective one of:
a first mode, wherein, with respect to a domain to which the first mode corresponds, the first mode is to:
enable the first circuit to generate respective integrity information based on respective data which is successfully written to the corresponding domain during the state; and
prevent an access by the second circuit to respective data which is successfully read from the corresponding domain during the state, the access to determine a validity of the respective data; or
a second mode, wherein, with respect to a domain to which the second mode corresponds, the second mode is to:
enable the first circuit to generate respective integrity information based on respective data which is successfully written to the corresponding domain during the state; and
enable an access by the second circuit to respective data which is successfully read from the corresponding domain during the state, the access to determine a validity of the respective data.

10. The processor of claim 9, wherein the state corresponds the first domain to the first mode and corresponds a second domain of the multiple domains to the second mode.

11. The processor of claim 9, wherein the state is a first state which corresponds a first domain of the multiple domains to the first mode, and wherein:
the first circuitry is further to execute another software process; and
the second circuitry, responsive to the other software process, is further to communicate to the integrated circuitry a second command to set a second state of the integrated circuitry, wherein the second state corresponds the first domain to the second mode.

12. The processor of claim 9, wherein a default state of the integrated circuitry corresponds multiple domains of the memory each with the first mode.

13. The processor of claim 8, wherein the processor is to access the first domain to perform a process of a virtual machine.

14. One or more non-volatile computer-readable storage media having stored thereon instructions which, when executed by one or more processing units, cause the one or more processing units to perform a method comprising:
accessing a memory coupled to the one or more processing units, wherein an integrated circuit is coupled to the one or more processing units and to the memory, wherein the integrated circuit comprises both a first circuit to detect a request to write data to the memory and, based on the request, to perform a calculation with the data to generate integrity information, and a second circuit to determine a validity of a version of the data based on both the integrity information and another request to read the data from the memory; and
communicating from the one or more processing units to the integrated circuit a command which indicates a first domain of the memory, wherein the integrated circuit transitions to a state based on the indication, wherein the state:
enables the first circuit to generate first integrity information based on first data which is successfully written to the first domain during the state; and
prevents an access by the second circuit to second data which is successfully read from the first domain during the state, the access to determine a validity of the second data.

15. The one or more computer-readable storage media of claim 14, wherein the state corresponds multiple domains of the memory each with a respective one of:
a first mode, wherein, with respect to a domain to which the first mode corresponds, the first mode is to:
enable the first circuit to generate respective integrity information based on respective data which is successfully written to the corresponding domain during the state; and
prevent an access by the second circuit to respective data which is successfully read from the corresponding domain during the state, the access to determine a validity of the respective data; or
a second mode, wherein, with respect to a domain to which the second mode corresponds, the second mode is to:
enable the first circuit to generate respective integrity information based on respective data which is successfully written to the corresponding domain during the state; and
enable an access by the second circuit to respective data which is successfully read from the corresponding domain during the state, the access to determine a validity of the respective data.

16. The one or more computer-readable storage media of claim 15, wherein the state corresponds the first domain to the first mode and corresponds a second domain of the multiple domains to the second mode.

17. The one or more computer-readable storage media of claim 15, wherein the state is a first state which corresponds a first domain of the multiple domains to the first mode, the method further comprising:

communicating to the integrated circuit a second command to set a second state of the integrated circuit, wherein the second state corresponds the first domain to the second mode.

18. The one or more computer-readable storage media of claim 14, wherein the one or more processing units access the first domain to perform a process of a virtual machine.

19. A method at an integrated circuit, the method comprising:
 detecting a command from a processor while the integrated circuit is coupled to the processor and to a memory, wherein the command indicates a first domain of the memory, wherein the integrated circuit comprises:
  a first circuit to detect a request to write data to the memory and, based on the request, to perform a calculation with the data to generate integrity information; and
  a second circuit to determine a validity of a version of the data based on both the integrity information and another request to read the data from the memory; and
 transitioning the integrated circuit to a state based on the instruction, wherein the state:
  enables the first circuit to generate first integrity information based on first data which is successfully written to the first domain during the state; and
  prevents an access by the second circuit to second data which is successfully read from the first domain during the state, the access to determine a validity of the second data.

20. The method of claim 19, wherein the state corresponds multiple domains of the memory each with a respective one of:
 a first mode, wherein, with respect to a domain to which the first mode corresponds, the first mode is to:
  enable the first circuit to generate respective integrity information based on respective data which is successfully written to the corresponding domain during the state; and
  prevent an access by the second circuit to respective data which is successfully read from the corresponding domain during the state, the access to determine a validity of the respective data; or
 a second mode, wherein, with respect to a domain to which the second mode corresponds, the second mode is to:
  enable the first circuit to generate respective integrity information based on respective data which is successfully written to the corresponding domain during the state; and
  enable an access by the second circuit to respective data which is successfully read from the corresponding domain during the state, the access to determine a validity of the respective data.

21. The method of claim 20, wherein the state corresponds the first domain to the first mode and corresponds a second domain of the multiple domains to the second mode.

22. The method of claim 20, wherein a default state of the integrated circuit corresponds multiple domains of the memory each with the first mode.

23. The method of claim 19, further comprising performing a cryptographic operation on data being communicated with the processor and the memory.

* * * * *